United States Patent
Ortiz et al.

(10) Patent No.: US 10,721,949 B2
(45) Date of Patent: Jul. 28, 2020

(54) ACRYLAMIDE CONTROL IN COOKED FOOD PRODUCTS

(71) Applicant: Kellogg Company, Battle Creek, MI (US)

(72) Inventors: Deirdre E. Ortiz, Battle Creek, MI (US); Stephen Paul Zimmerman, Battle Creek, MI (US); John David Pinkston, Battle Creek, MI (US)

(73) Assignee: KELLOGG COMPANY, Battle Creek, MI (US)

( * ) Notice: Subject to any disclaimer, the term of this patent is extended or adjusted under 35 U.S.C. 154(b) by 217 days.

(21) Appl. No.: 15/671,510

(22) Filed: Aug. 8, 2017

(65) Prior Publication Data

US 2018/0042275 A1 Feb. 15, 2018

Related U.S. Application Data

(60) Provisional application No. 62/372,528, filed on Aug. 9, 2016.

(51) Int. Cl.
*A23L 5/20* (2016.01)
*A23L 7/117* (2016.01)
(Continued)

(52) U.S. Cl.
CPC .............. *A23L 5/20* (2016.08); *A21D 13/02* (2013.01); *A23L 5/10* (2016.08); *A23L 7/00* (2016.08);
(Continued)

(58) Field of Classification Search
None
See application file for complete search history.

(56) References Cited

U.S. PATENT DOCUMENTS 2,725,300 A 11/1955 Cryns
2,920,964 A 1/1960 Oakes
(Continued)

FOREIGN PATENT DOCUMENTS

CN 1561866 A 1/2005
CN 102793089 11/2012
(Continued)

OTHER PUBLICATIONS

Vivante: Level of Acrylamide Precursors Asparagine, Fructose, Glucose, and Sucrose in Potatoes Sold at Retail in Italy and in the United States; vol. 71, Nr. 2, 2006—Journal of Food Science C81, Published on Web Feb. 22, 2006. (Year: 2006).*

(Continued)

*Primary Examiner* — Patricia A George
(74) *Attorney, Agent, or Firm* — Honigman LLP; Kathryn D. Doyle, Esq.; Jonathan P. O'Brien

(57) ABSTRACT

The present disclosure relates to methods of reducing the formation of acrylamide in a thermally processed food product and to cooked food products with reduced acrylamide. The method comprises providing a food product or food intermediate in need of reduction of formation of acrylamide during thermal processing and applying a bran composition to the food product or food intermediate in an amount effective to reduce formation of acrylamide during thermal processing to a level that is lower than if the composition had not been applied.

9 Claims, 1 Drawing Sheet

(51) Int. Cl.
*A21D 13/02* (2006.01)
*A23L 7/00* (2016.01)
*A23L 7/10* (2016.01)
*A23L 33/22* (2016.01)
*A23L 33/21* (2016.01)
*A23L 19/18* (2016.01)
*A23L 7/13* (2016.01)
*A23L 5/10* (2016.01)

(52) U.S. Cl.
CPC ............. *A23L 7/115* (2016.08); *A23L 7/117* (2016.08); *A23L 7/13* (2016.08); *A23L 19/18* (2016.08); *A23L 33/21* (2016.08); *A23L 33/22* (2016.08); *A23V 2002/00* (2013.01)

(56) References Cited

U.S. PATENT DOCUMENTS

| | | | |
|---|---|---|---|
| 3,879,373 A | 4/1975 | Gerrish et al. | |
| 3,998,975 A | 12/1976 | Liepa | |
| 4,179,445 A | 12/1979 | Sieb et al. | |
| 4,526,800 A * | 7/1985 | Howard | A23L 7/115 426/440 |
| 4,900,577 A | 2/1990 | Arciszewski et al. | |
| 5,045,335 A | 9/1991 | De Rooij et al. | |
| 5,066,499 A | 11/1991 | Arciszewski et al. | |
| 5,104,673 A | 4/1992 | Fazzolare et al. | |
| 5,126,153 A | 6/1992 | Beck | |
| 5,464,642 A | 11/1995 | Villagran et al. | |
| 5,690,982 A | 11/1997 | Fazzolare et al. | |
| 5,802,959 A | 9/1998 | Benson et al. | |
| 6,235,333 B1 | 5/2001 | Martines-Serna Villagran et al. | |
| 6,251,465 B1 | 6/2001 | Bello et al. | |
| 6,287,622 B1 | 9/2001 | Martinez-Serna Villagran et al. | |
| 6,413,562 B2 | 7/2002 | Conforti et al. | |
| 6,432,463 B1 | 8/2002 | Bhaskar et al. | |
| 6,468,573 B1 | 10/2002 | Herrick et al. | |
| 6,555,153 B1 | 4/2003 | Keller et al. | |
| 6,572,910 B2 | 6/2003 | Lanner et al. | |
| 6,703,065 B2 | 3/2004 | Villagran et al. | |
| 6,989,167 B2 | 1/2006 | Howie et al. | |
| 7,045,161 B2 | 5/2006 | Takeuchi et al. | |
| 7,060,318 B2 | 6/2006 | Villagran et al. | |
| 7,482,033 B2 | 1/2009 | Villagran et al. | |
| 7,709,034 B2 | 5/2010 | Abbas et al. | |
| 7,770,513 B2 | 8/2010 | Van Poucke | |
| 7,947,320 B2 | 5/2011 | Faa | |
| 8,017,166 B2 | 9/2011 | Twitty | |
| 8,133,527 B2 | 3/2012 | Haynes | |
| 8,161,871 B2 | 4/2012 | Van Poucke | |
| 8,173,193 B2 | 5/2012 | Haynes et al. | |
| 8,206,766 B2 | 6/2012 | Zhang et al. | |
| 8,227,005 B2 | 7/2012 | Van Poucke | |
| 8,440,251 B2 | 5/2013 | Villagran et al. | |
| 8,455,037 B2 | 6/2013 | Haynes | |
| 8,632,835 B2 | 1/2014 | Joseph et al. | |
| 8,652,557 B2 | 2/2014 | Mingus et al. | |
| 8,703,226 B2 | 4/2014 | Bortone et al. | |
| 8,926,308 B2 | 1/2015 | Mihalos et al. | |
| 9,089,155 B2 | 7/2015 | Williams et al. | |
| 2003/0104103 A1* | 6/2003 | Monsalve-Gonzalez | A21D 2/04 426/549 |
| 2004/0224066 A1 | 11/2004 | Lindsay et al. | |
| 2005/0037123 A1 | 2/2005 | Plank et al. | |
| 2005/0079254 A1 | 4/2005 | Corrigan | |
| 2005/0118322 A1 | 6/2005 | Elder | |
| 2005/0281930 A1 | 12/2005 | Nowakowski et al. | |
| 2006/0194743 A1 | 8/2006 | Oku et al. | |
| 2006/0280851 A1 | 12/2006 | Pike | |
| 2006/0286242 A1 | 12/2006 | Villagran | |
| 2007/0031569 A1 | 2/2007 | Halpern et al. | |
| 2007/0141225 A1 | 6/2007 | Elder et al. | |
| 2007/0178219 A1 | 8/2007 | Boudreaux et al. | |
| 2007/0259090 A1 | 11/2007 | Taylor | |
| 2008/0102162 A1 | 5/2008 | Delcour et al. | |
| 2008/0166452 A1 | 7/2008 | Corrigan | |
| 2009/0191310 A1 | 7/2009 | Zyzak et al. | |
| 2009/0304879 A1 | 12/2009 | Zhang et al. | |
| 2010/0143540 A1 | 6/2010 | Bhaskar et al. | |
| 2010/0166939 A1 | 7/2010 | Lotz et al. | |
| 2011/0104345 A1 | 5/2011 | Bhaskar et al. | |
| 2011/0129586 A1* | 6/2011 | Ntiamoah | A01H 5/10 426/549 |
| 2011/0274741 A1 | 11/2011 | Horton | |
| 2012/0088019 A1 | 4/2012 | Bourg, Jr. et al. | |
| 2013/0101712 A1 | 4/2013 | Kimura et al. | |
| 2013/0259978 A1 | 10/2013 | Bouvet et al. | |
| 2014/0106052 A1 | 4/2014 | Hawley et al. | |

FOREIGN PATENT DOCUMENTS

| | | |
|---|---|---|
| EP | 2555637 B1 | 6/2019 |
| JP | 2006256977 | 9/2006 |
| WO | 0167891 A1 | 9/2001 |
| WO | 0178528 A2 | 10/2001 |
| WO | 2004004484 A2 | 1/2004 |
| WO | 2004028278 A2 | 4/2004 |
| WO | 2004075655 A2 | 9/2004 |
| WO | 2004075656 A2 | 9/2004 |
| WO | 2007092087 A2 | 8/2007 |
| WO | 2011019353 A1 | 2/2011 |
| WO | 2011124678 A1 | 10/2011 |
| WO | 2012032203 A1 | 3/2012 |
| WO | 2013162489 A1 | 10/2013 |

OTHER PUBLICATIONS

Finnie: Influence of Cultivar and Environment on Water-Soluble and Water-Insoluble Arabinoxylans in Soft Wheat; Cereal Chem. 83(6):617-623, vol. 83, No. 6, 2006 617. (Year: 2006).*

Gunenc: Extraction, bioactivity, and stability of wheat bran alkylresorcinols; © 2014, Aynur Gunenc. (Year: 2014).*

CP: Chemical Processing: Solid Success; published online at least by Jan. 16, 2015 at: https://web.archive.org/web/20150116083046/ https://www.chemicalprocessing.com/articles/2003/102/ (Year: 2015).*

Beaugrand: Arabinoxylan and hydroxycinnamate content of wheat bran in relation to endoxylanase susceptibility; Journal of Cereal Science 40 (2004) 223-230. (Year: 2004).*

HL: Hunter Lab: Hunter Lab Color Scale; Aug. 1-15, 1996, vol. 8, No. 9. (Year: 1996).*

Rufian-Henares: Acrylamide content of selected Spanish foods: A survey of biscuits and bread derivatives; Food Additives and Contaminants, 2007, 24 (04), pp. 343-350. (Year: 2007).*

Vass: Ways to Reduce the Acrylamide Formation in Cracker Products ; Czech J. Food Sci.: Proc. Chemical Reaction in Food V, Prague, vol. 22, 2004 (Year: 2004).*

PCT/US2017/045878 International Search Report dated Nov. 17, 2017.

Advisory Committee on Novel Foods and Processes, Committee Paper for Discussion, ACNFP/102/P1, Wheat Bran Extract, Apr. 2011.

Basta, N., contributing editor, New grinding media and equipment designs enhance the performance of mills and dispersers, Chmical processing: 2003; Solid Success; publd online at least by Jan. 16, 2015 at https://web.archive.org/web/20150116083046/https://www. chemicalprocessing.com/articles/2003/102/, (Year: 2015).

Beaugrand, J., et al., Arabinoxylan and hydroxycinnamate content of wheat bran in relation to endoxylanase susceptibility, Journal of Cereal Science 40 (2004) 223-230, Elsevier.

Becalski, A. et al., 51 J. Agric. Food Chem., 802-808 (2003).

Capuano, Eduardo, et al, Effect of flour type on Maillard reaction and acrylamide formation during toasting of bread crisp model systems and mitigation strategies, Food Research International 42 (2009) 1295-1302, Elsevier.

Capuano, Edoardo, et al, Lipid oxidation promotes acrylamide formation in fat-rich model systems, Food Research Intl 43 (2010) 1021-1026, Elsevier.

(56) References Cited

OTHER PUBLICATIONS

Czuchajowska, Z., et al., Water Activity and Moisture Content of Dough and Bread, 66:2 Cereal Chem., 128-132 (1989).
Du, C. et al; Evaluating the Feasibility of Commercial Arabinoxylan Production in the Context of a Wheat Biorefinery Principally Producing Ethanol, Part 1, Experimental Studies of Arabinoxylan Extraction from wheat Bran; Chemical Engineering Res & Design, Elsevier, Amsterdam, NL, vol. 87, No. 9, Sep. 1, 2009, pp. 1232-1238; XP026613640.
Finnie, S.M., et al, Influence of Cultivar and Enviroment on Water-Soluble and Water-Insoluble Arabinoxylans in Soft Wheat, Cereal Chemistry, 83 (6): 617-623, vol. 83, No. 6, 2006, 617. (Year: 2006).
Fiselier, K., et al, Brown potato croquettes low I n acrylamide by coating with egg/breadcrumbs, Eur. Food Res. Technol. (2004) 219:111-115, Springer-Verlag.
Food Drink Europe, Reduction of Acrylamide in Fried Potato Crisps, Annex 1 to FCP/AATEC/032/11E.
Food Drink Europe, Reduction of Acrylamide in Fried Potato Products/French Fries, Annex 1 to FCP/AATEC/033/11E.
Food Drink Europe, Reduction of Acrylamide in Breakfast Cereals.
Gokmen, Vural, et al., Development of Functional Bread Containing Nanoencapsulated Omega-3 Fatty Acids, J of Food Engineering, 105 (2011) 585-591, Elsevier Ltd.
Gunenc, Aynur, Extraction, bioactivity, and stability of wheat bran alkylresorcinols, a thesis submitted to the Faculty of Graduate and Postdoctoral Affairs in partial fulfillment of the requirements for the degree of Doctor of Philosophy in Chemistry, Food Science and Nutrition, Carleton University, Ottawa, Ontario, 2014.
Hunter Lab, Hunter Lab Color Scale; Aug. 1-15, 1996, vol. 8, No. 9 (Year: 1996).
Ismial, Samir Abdel-Monem Ahmed, et al, Impact of Pre-Treatments on the Acrylamide Formation and Organoleptic Evolution of Fried Potato Chips, Am J of Biochemistry and Biotechnology 9 (2): 90-101, 2013, Science Publication.
Levine, Robert A., et al, Sources of Variability of Acrylamide Levels in a Cracker Model, J. Agric. Food Chem. 2005, 53, 4410-4416, American Chemical Society.
Maes, C. and J.A. Delcour, Structural Characterisation of Water-extractable and Water-unextractable Arabinoxylans in Wheat Bran, 35:3 J. Cereal Sci., 315-326 (2002).
Mestdagh, Frederic, et al, Impact of additives to lower the formation of acrylamide in a potato model system through pH reductin and other mechanisms, ScienceDirect, Food Chemistry 1017 (2008) 26-31, Elsevie.
Morales, Francisco, et al, Mitigation Strategies to reduce acrylamide formation in fried potato products, Annals of the NY Academy of Sciences 1126, pp. 89-100 (2008).
Mustafa, Arwa, et al, Factors Influencing Acrylamide Content and Color in Rye Crisp Bread, J.Agric. Food Chem. 2005, 53, 5985-5989, American Chemical Society.
Ou, Shi-yi, et al, Removal of Acrylamide With Several Additives, Jinan University, Dept of Food Science and Engineering, Jul. 29, 2004 and English Abstract.
Ou, Shi-yi, et al, Reduction of acrylamide formation by selected agents in fried potato crisps on industrial scale, ScienceDirect, Innovtive Food Science and Emergeing Technologies 9 (2008) 116-121, Elsevier.
Ou, Shiyi, et al, Effect of antioxidants on elimination and formation of acrylamide in model reaction systems, Journal of Hazardous Materials 182 (2010) 863-868, Elsevier.
Pareyt, Bram, et al, Arabinoxylan oligosaccharides (AXOS) as a potential sucrose replacer in sugar-snap cookies, LWT Food Science and Technology 44 (2011) 725-728, Elsevier.
Pedreschi, Franco, et al, Acrylamide content and color development in fried potato strips, ScienceDirect, Food Research Intl 39 (2006) 40-46, Elsevier.
Rufian-Henares, Jose A., et al, Acrylamide content of selected Spanish foods: survey of biscuits and bread derivatives, Food Additives and Contaminants, Apr. 2007, 24(4), 343-350, Taylor & Francis Group.
Sekena, H. Abd El-Aziem, et al, Cehmoprevention of barley and sage against acrylamide-induced genotoxic, biochemical and histopathological alterations in rats, The Egyptian J of Hospital Medicine, vol. 15, 40-56, Jun. 2004.
Serpen, Arda, et al, Effects of different grain mixtures on Maillard reaction products and total antioxidant capacities of breads, J of Food Composition and Analysis 26 (2012) 160-168, Elsevier.
Taeymans, Dominique, et al, a review of acrylamide: an industry perspective on research, analysis, formation and control, Critical Reviews in Food Science and Nutrition, 44:323-347 (2004), Taylor and Francis Inc.
Tareke, E. et al., 50 J. Agric. Food Chem., 4998-5006 (2002).
Vivanti, Vittorio, et al., Level of Acrylamide Precursors Asparagine, Fructose, Glucose, and Sucrose in Potatoes Sold at Retail in Italy and in the United States, Food Chemistry and Toxicology, Journal of Food Sicence, vol. 71, Nr. 2, 2006; Institute of Food Technologies.
Yaylayan, V.A. et al., 51 J. Agric. Food Chem., 1753-1757 (2003).
Yu, Lilei, et al, Comparison of antioxidant properties of refined and whole wheat flour and bread, Antioxidants 2013, 2, 370-383.
Zeng, Xiaohur, et al., Activities of hydrocolloids as inhibitors of acrylamide formation in model systems and fried potato strips, Food Chemistry 121 (2010) 424-428, Elsevier.
Zhang, Yu, et al, Addition of antioxidant of bamboo leaves (AOB) effectively reduces acrylamide formation in potato crisps and french fries, J. Agric. Food Chem. 2007, 55, 523-528, American Chemical Society.
Zhang, Yu, et al., Effect of natural antioxidants on kinetic behaviour of acrylamide formation and elimination in low-moisture asparagine-glucose model system, ScienceDirect, J of Food Engineering 85 (2008) 105-115, Elsevier.
Zyzak, David V. et al., 51 J. Agric. Food Chem., 4782-4787 (2003).
Wikipedia: Schiff Base; http://en.wikipedia.org/wiki/Schiff_base, printed Aug. 13, 2013.
Wikipedia: Ferulic Acid; http://en.wikipedia.org/wiki/Ferulic_acid, printed Aug. 13, 2013.
Wikipedia: Diferulic Acids; http://en.wikipedia.org/wiki/Diferulic_acids, printed Aug. 13, 2013.
Wikipedia: Asparagine; http://en.wikipedia.org/wiki/Asparagine, printed Aug. 13, 2013.

* cited by examiner

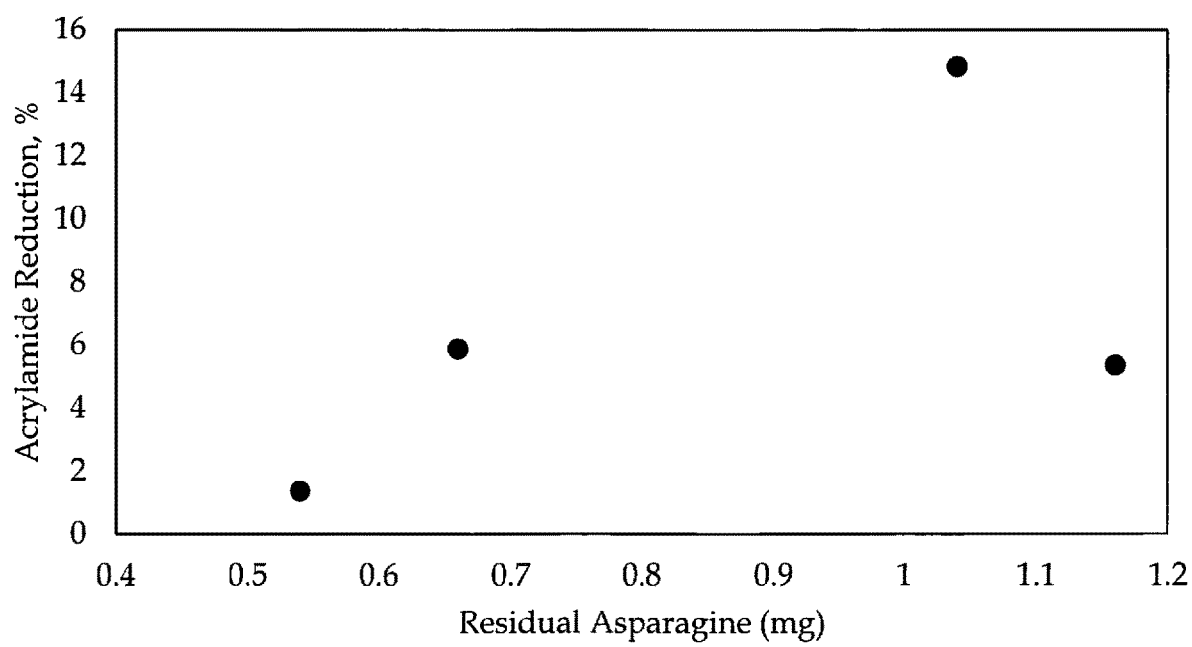

ACRYLAMIDE CONTROL IN COOKED FOOD PRODUCTS

CROSS-REFERENCE TO RELATED APPLICATIONS

This application claims the benefit of U.S. Provisional application No. 62/372,528, filed on Aug. 9, 2016, which is incorporated herein by reference in its entirety.

TECHNICAL FIELD

This disclosure relates to a method for reduction of formation of acrylamide in a thermally processed food product, and a food product produced by said method.

BACKGROUND

The statements in this section merely provide background information related to the present disclosure and may not constitute prior art.

The Maillard reaction is responsible for producing much of the color and flavor in processed foods, such as those produced during the typical heating, cooking, frying, baking, or roasting steps that accompany the production of breads, cereals, potato snacks, and pastries. It has also been found that acrylamide is formed in these heated carbohydrate-rich foods (Tareke, E. et al., 50 *J. Agric. Food Chem.*, 4998-5006 (2002). Although further research is needed to assess what health effects, if any, may result from human consumption of acrylamide at the levels commonly found in cooked foods, some consumers have voiced concern.

Asparagine, a major amino acid found in cereals (grains) and potatoes, is thought to be the significant player in acrylamide production (Yaylayan, V. A. et al., 51 *J. Agric. Food Chem.*, 1753-1757 (2003); and Becalski, A. et al., 51 *J. Agric. Food Chem.*, 802-808 (2003)). Asparagine has an amide group attached to a chain of two carbon atoms. The degradation of the amino acids in the presence of dicarbonyl products from the Maillard reaction causes the amino acid to become decarboxylated and deaminated to create an aldehyde. When glucose and asparagine are reacted at elevated temperatures, particularly those above 100° C., more typically above 120° C., and usually above 185° C., substantial levels of acrylamide may be produced (Elmore, J. S. et al., 51 *J. Agric. Food Chem.*, 4782-4787 (2003)).

The levels of acrylamide vary considerably between foodstuffs within food groups, but potato chips and French fries generally contain high levels compared to many other food groups. Prior to 2002, the average acrylamide content in potato chips was about 1000 µg/kg and in French fries was about 500 µg/kg. Other food groups that may contain high levels of acrylamide include crisp bread, breakfast cereals, fried potato products, biscuits, and certain cookies and snacks.

Common solutions to reduce acrylamide formation can be expensive or deleterious to the taste quality of the food. For example, asparaginase is an enzyme that is effective in reducing acrylamide formation during cooking by, for example, converting the asparagine to aspartic acid, which does not react to produce acrylamide (See, WO 2004/0086597). However, this approach adds significant material cost and often requires separate dosing and mixing systems. Other approaches limit the browning reaction during cooking as a means of also reducing acrylamide formation (See, U.S. Pat. Pub. No. 2004/0224066). Lowering pH by use of food grade acids such as citric acid, lowering the reducing sugar content, or lowering the cooking temperature are also illustrative of the approaches taken to reduce acrylamide (WO 2004/028278; WO 2004/075655; and WO 2004/075656). Unfortunately, approaches that limit browning typically alter the appearance and flavor of the food by removing color and the pleasant caramelized flavor notes that make the food taste enjoyable.

Accordingly, it is an object of the present disclosure to provide a method for reducing the level of acrylamide in foods. The method avoids alteration of the cooked food product appearance and flavor. It is also an object of the present disclosure to provide food products having reduced levels of acrylamide.

SUMMARY

The present disclosure relates to the reduction of acrylamide in cooked food products and to cooked food products having reduced levels of acrylamide. It was surprisingly found that arabinoxylan complexes are effective acrylamide control agents. The arabinoxylan complexes were found to be particularly effective in reducing acrylamide levels in cooked products where there is significant moisture reduction and likely occurrence of Maillard browning reactions. Without being bound to any theory, the present disclosure may prevent and/or reduce reaction(s) that directly result in acrylamide formation during cooking. It may also prevent and/or reduce reaction(s) that provide materials that further react to provide acrylamide, namely acrylamide precursors.

It was also surprisingly found that the effectiveness of the arabinoxylan complexes is highly level dependent on concentration, as a eutectic relationship is observed such that there is a local optimum where effectiveness diminishes when the level is higher or lower than the local optimum. Over the course of development for the present disclosure, it was found that adding concentrated or purified arabinoxylan complexes at a level ranging from about 0.01 to about 2% to the food product or food product intermediate was found to be highly effective at reducing acrylamide formation. The bran component of selective cereal grains containing arabinoxylan complexes was also found to be an effective acrylamide reduction agent. It was further found that selective processing steps can enhance the acrylamide reduction performance of said bran components.

The advantages of using brans to reduce acrylamide formation are numerous. These advantages include: (a) they are relatively inexpensive to use; (b) they don't require the use of separate dosing and mixing systems for addition to foodstuffs; (c) they don't limit the browning reaction during cooking; (d) they don't remove pleasant caramelized flavor notes that make the food taste enjoyable; (e) they are natural, nontoxic substances; and (f) they are active at low concentrations and under very mild conditions of temperature and pH.

In one aspect, the present disclosure provides a cooked food product having reduced acrylamide levels after cooking, baking, frying, heating, or combinations thereof. The cooked food product comprises a food product or food intermediate derived from cereal or vegetable-based components or combinations thereof and an amount of a bran composition ranging from about 0.10% to about 5% by weight of the food product or food intermediate on a dry weight basis. The bran composition has an average particle size and the bran composition comprises an arabinoxylan complex in an amount of about 10% to about 40% by weight of the bran composition.

In another aspect, the present disclosure provides an acrylamide inhibitor composition for thermal processing of a food product or food intermediate comprising a bran composition comprising from about 10% to about 40% of an arabinoxylan complex.

In still another aspect, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition.

In yet another aspect, the present disclosure provides a method of reduction of formation of acrylamide in a heat-treated food product. The method comprises providing a food product or food intermediate in need of reduction of formation of acrylamide during heating and applying a bran composition to the food product or food intermediate in an amount effective to reduce formation of acrylamide during thermal processing to a level that is lower than if the composition had not been applied. The food product or food intermediate is subjected to thermal processing of at least about 120° F. The composition comprises an arabinoxylan complex in an amount of about 10% to about 40% by weight of the bran composition.

In an additional aspect, the present disclosure provides a process for reducing an amount of acrylamide formation in a cooked food product containing an amino acid and a reducing sugar. The method comprises contacting a food product or food intermediate with a bran composition prior to thermal processing. The reduction is in comparison with a cooked food product that has not been contacted with the bran composition. The bran composition comprises an arabinoxylan complex in an amount of about 10% to about 40% by weight of the bran composition.

In one aspect, the present disclosure provides a cooked food product having a reduced acrylamide level after cooking, comprising: a food product or food product intermediate derived from cereal or vegetable-based components or combination thereof; and an extracted arabinoxylan complex in an amount of about 0.01% to about 10% by weight of the food product or food product intermediate.

In another aspect, the present disclosure provides a method of reducing the amount of acrylamide produced by thermal processing of a food product or food intermediate comprising free asparagine and a reducing sugar, the method comprising: adding an extracted arabinoxylan complex to the food product or food intermediate; and thermally processing the food product or food intermediate to form a cooked food product; wherein the food product or food intermediate comprises the extracted arabinoxylan complex in an amount of about 0.01% to about 10% by weight of the food product or food intermediate.

In yet another aspect, the present disclosure provides a method of reduction of formation of acrylamide in a heat-treated food product. The method comprises providing a food product or food intermediate in need of reduction of formation of acrylamide during heating and adding an extracted arabinoxylan complex to the food product or food intermediate in an amount effective to reduce formation of acrylamide during thermal processing to a level that is lower than if the extracted arabinoxylan complex had not been applied. The food product or food intermediate is subjected to thermal processing of at least about 120° F. The composition comprises an extracted arabinoxylan complex in an amount of about 0.01% to about 10% by weight of the food product or food intermediate.

In an additional aspect, the present disclosure provides a process for reducing an amount of acrylamide formation in a cooked food product containing an amino acid and a reducing sugar. The method comprises contacting a food product or food intermediate with an extracted arabinoxylan complex prior to thermal processing. The reduction is in comparison with a cooked food product that has not been contacted with the extracted arabinoxylan complex. The food product or food intermediate comprises an arabinoxylan complex in an amount of about 10% to about 40% by weight of the bran composition.

BRIEF DESCRIPTION OF THE DRAWING FIGURES

FIG. 1 is a graph of acrylamide reduction vs. residual asparagine.

DETAILED DESCRIPTION

The following description is merely exemplary in nature and is not intended to limit the present disclosure, application, or uses. The aspects and embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure. The following definitions and non-limiting guidelines must be considered in reviewing the description of the technology set forth herein.

The headings (such as "Introduction" and "Summary") and sub-headings used herein are intended only for general organization of topics within the present technology, and are not intended to limit the disclosure of the present technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. Any discussion of the content of references cited in the Introduction is intended merely to provide a general summary of assertions made by the authors of the references, and does not constitute an admission as to the accuracy of the content of such references. All references cited in the "Background" and "Detailed Description" sections of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made, or tested.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it is also envisioned that Parameter X may have other ranges of values including 1-9, 2-9, 3-8, 1-8, 1-3, 1-2, 2-10, 2.5-7.8, 2-8, 2-3, 3-10, and 3-9.

Although the open-ended term "comprising," is a synonym of terms such as including, containing, or having, its use herein to describe and claim the present disclosure, the disclosure, or embodiments thereof, may alternatively be described using more limiting terms such as "consisting of" or "consisting essentially of" the recited ingredients.

As used herein, the term "bran" means a cereal grain-derived milled fraction enriched in any or all of the tissues to be selected from aleurone, pericarp, seed coat, sepals, and petals, as compared to the corresponding intact cereal grain. In one embodiment, the bran composition comprises wheat, rye, barley, corn, flax, or combinations thereof. In some embodiments, the bran composition comprises wheat.

As used herein, the term "micro-pulverized" means a grain or grain component that has been subjected to micro-pulverization. Suitable methods and corresponding apparatus for micro-pulverization include, but are not limited to, ball mills, tube mills, bowl mills, jet mills, hammer mills, grinding mills, pin mills, air swept mills, and disc mills. In some embodiments, a grain or grain component is finely ground, for instance, with a grinding mills or ball mill, and then ultra-finely ground, for instance, with a jet mill, to obtain a grain or grain component having a particle size of about 30 microns to about 1000 microns.

As used herein, the term "arabinoxylan complex" means arabinose residues branched on a xylose backbone. The xylose backbone is composed of xylose pyranosyl and the arabinose residues are arabinose furanosyl. The xylopyranose residues may be branched only by one or by two arabinofuranoses. Further, the arabinoxylan complex consists of a linear backbone of $\beta$-(1→4) D-xylopyranosyl units to which $\alpha$-L-arabinofuranosyl substituents are attached through O-3 or O-2,3 positions of the xylose residues. Arabinoxylan complexes can exhibit different molecular features, which are determinant of their functional properties. Over the course of the present disclosure there was surprisingly found relationships between the molecular features of the arabinoxylan complex and efficacy as an acrylamide reduction agent.

In some embodiments, the arabinoxylan complex may further comprise an acid selected from the group consisting of cinnamic acid, ferulic acid, diferulic acid, dehydrodiferulic acid, p-coumaric acid, sinapic acid, caffeic acid, and methoxyphenol. In one embodiment, the acid is ferulic acid. In some embodiments, the acid can be linked to the O-5 positions of the terminal arabinose unit. In one embodiment, a cinnamic acid is linked to the O-5 position of the terminal arabinose units. In some embodiments, ferulic acid is linked to the O-5 position of the terminal arabinose unit.

A range of monosaccharide sugars may be attached to the arabinose units of the arabinoxylan complex. In embodiments, the arabinoxylan complex comprises the monosaccharide sugars rhamnose, arabinose, galactose, glucose, xylose, and glucuronic acid. In some embodiments, the arabinoxylan complex comprises the monosaccharide sugars glucose and glucuronic acid. In some embodiments, the arabinoxylan complex comprises monosaccharide sugars glucose in an amount of about 4% to about 10% and glucuronic acid in an amount of about 2% to about 8%.

The ratio of arabinose to xylose in cereal-based arabinoxylan ranges from 0.10 to over 1.0, depending on the tissue and plant species. In some embodiments, the arabinoxylan complex comprises an arabinose to xylose ratio of about 0.1 to about 1.2, about 0.4 to about 1.2, about 0.55 to about 1.2, or about 0.9 to about 1.2.

In some embodiments, the arabinoxylan complex can comprise water extractable or water unextractable arabinoxylan units. In some embodiments, the arabinoxylan complex contains from about 0.1% to about 30%, about 0.1% to about 10%, or about 4% to about 10% water extractable arabinoxylan units.

The arabinoxylan complexes can be sourced from the endosperm and bran of cereal grains or their by-products, and in some cases sourced from the bran due to the higher concentration of the arabinoxylan complex that is present. In some embodiments, the source of the arabinoxylan complex is from one or more cereal grains including wheat, corn, rye, barley, flax, sorghum, and combinations thereof. In some embodiments, the source of the arabinoxylan complex is derived from wheat, corn, rye, or combinations thereof. In some embodiments, the source of the arabinoxylan complex is wheat.

Methods for extracting and purifying arabinoxylan complexes from cereal grain sources are known to one skilled in the art. See, C. Du, et al., *Evaluating the feasibility of commercial arabinoxylan production in the context of a wheat biorefinery principally producing ethanol. Part 1. Experimental studies of arabinoxylan extraction from wheat bran*, 87 CHEM. ENG'G RESEARCH AND DESIGN, 1232-1238

(2009); and C. Maes and J. A. Delcour, *Structural Characterisation of Water-extractable and Water-unextractable Arabinoxylans in Wheat Bran*, 35:3 J. CEREAL. Sci., 315-326 (2002).

As used herein, the term "extracted arabinoxylan complex" means a concentrated or purified arabinoxylan complex derived from a cereal grain. Any suitable method that is commonly known in the art may be used for concentrating, extracting, and purifying arabinoxylan complexes from cereal grains.

As used herein "baked goods" refers to any kind of baked product prepared from dough, sponge and dough or batter, either of a soft or a crisp character, either of a white, light or dark type. The dough or batter is generally a flour dough or batter comprising wheat meal or wheat flour and/or other types of meal, flour or starch such as corn flour, cornstarch, rye meal, rye flour, oat flour, oatmeal, soy flour, sorghum meal, sorghum flour, rice starch, rice flour, potato meal, potato flour or potato starch. The dough or batter is generally leavened by the addition of a suitable microbial culture, preferably yeast culture, such as a culture of *Saccharomyces cerevisiae* (baker's yeast) or by the addition of a chemical leavening agent. Suitable chemical leavening agents include, but are not limited to, sodium bicarbonate, tartaric acid or cream of tartar, monocalcium phosphates, sodium aluminum sulfate, disodium pyrophosphates, ammonium bicarbonate, ammonium carbonate, and ammonium bicarbonate. Preferred chemical leaving agents have less impact on increasing the rate of Maillard browning reactions and subsequent acrylamide formation. The dough may be fresh, frozen, or par-baked. Preferred edible dough based baked goods include bread (in particular white, wheat, whole-meal, low-carb, brown, multi-grain, dark and rye bread), typically in the form of loaves, buns or rolls, and more preferably, pan bread, hamburger buns, French baguette-type bread, pita bread, tortillas, sponge cakes, pancakes, biscuits, crackers cookies, pie crusts, crisp bread, steamed bread, pizza crust and the like. The dough or batter may also comprise other conventional dough ingredients, e.g.: proteins, such as milk or milk powder, gluten, and soy; eggs (either whole eggs, egg yolks or egg whites); shortening such as granulated fat or oil; an oxidant such as ascorbic acid, potassium bromate, potassium iodate, azodicarbonamide (ADA) or ammonium persulfate; a reducing agent such as L-cysteine; a sugar; a salt such as sodium chloride, calcium acetate, sodium sulfate or calcium sulfate. The dough may further comprise an emulsifier such as mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, phospholipids, lecithin, and lysolecithin.

As used herein a "cooked food product" is a food product that has been subjected to thermal processing, or cooking. Any food product, food product intermediate, or food material may be subjected to cooking, or thermal processing, to obtain a cooked food product. A cooked food product can contain about 10 wt % to about 100 wt % of a cereal or tuber based flour or starch material, about 20 wt % to about 100 wt % of a cereal or tuber based flour or starch material, about 30 wt % to about 90 wt % of a tuber based flour or starch material, or about 40 wt % to about 80 wt % of tuber based flour or starch material.

As used herein a "food product" and "food intermediate" may include an additive, component, supplement, or ingredient useful in preparing or supplementing a food, or a food intermediate, or a fully prepared composition but in a raw state (requiring a further treatment step prior to consumption, such as baking dough to produce bread). Food products and food intermediates as provided hereunder generally include any type of food product, food ingredient, food intermediate, or mixtures thereof. The food products and food intermediates can be in any suitable form, including raw or pre-treated. Suitable methods of pre-treating the food products and food intermediates include, but are not limited to, blanching, steaming, boiling, chopping, macerating, comminuting, reducing the particle size, drying with heat, and combinations thereof.

As used herein "free asparagine" means asparagine that is not incorporated into proteins or large peptides.

As used herein "reducing sugar" means a sugar selected from group consisting of fructose, dextrose, lactose, galactose, glucose, xylose, mannose, cellobiose, maltose, and combinations thereof.

In the present disclosure, by the term "prevention and/or reduction of acrylamide formation" it is meant that the amount of acrylamide produced is reduced and/or the period of time required for formation of a given amount of acrylamide is increased.

As used herein "thermal processing" or "thermally processed" means heating by any method. Thermal processing is synonymous with cooking, baking, frying, boiling, grilling, and the like. The term "heat-treated" is also equivalent to thermally processed. Food products of interest in the present disclosure include those that are thermally processed at high temperatures with operations that include, but are not limited to, baking (conductive, convective, or radiant), frying, drying, extrusion cooking, microwave heating, ohmic heating, radio frequency heating, or fluidized bed heat transfer. In some embodiments, the present disclosure is suitable for use in food products where the food is elevated to a temperature above the boiling point of water. In some embodiments, the present disclosure is suitable for use in foods that have a propensity to form acrylamide upon thermal processing. Typically, these foods consist of sufficient amounts of reducing sugars and asparagine to promote acrylamide formation with heating.

As used herein "cereals" means flours or starches derived from cereal grains. Sources can include, but are not limited to wheat, rye, barley, corn, rice, and sorghum.

As used herein "tubers" means flours or starches derived from tubers. Sources can include, but are not limited to potato, sweet potato, and tapioca.

As used herein "flour" means a cereal or tuber based material that has undergone milling or grinding to produce a powder or reduced particle size material. Many suitable milling processes for making flour are available to one skilled in the art.

As used herein "whole grain flour" means a milled cereal grain where the bran and germ are still present.

As used herein "starch" means the native, uncooked starch granule that has been separated from cereal grain or tuber cell structure.

As used herein "dry weight basis" means the percent of a material as part of the composition of a food or food intermediate after all of the moisture has been substantially removed such that the food or food product intermediate is less than about 1% total moisture content, less than about 0.5% moisture content, or less than about 0.2% moisture content.

Food Intermediates

In certain embodiments, the food intermediate is derived by mixing one or more dry ingredients with water and other additives to create a dough. The dry mixture comprises flour and starch components, typically sourced from cereal grains or tubers. The flours and starches are milled and dried prior to use. In some embodiments, cereal grains include wheat, corn, rye, and barley. In some embodiments, the cereal grains include wheat and corn. In some embodiments, the cereal grain is wheat. Cereal grains derived from the whole grain are also suitable for use. Any suitable method for obtaining a flour or starch component from a grain may be used. In some embodiments, a tuber-based flour is sourced from potatoes or sweet potatoes. In some embodiments, the potato flour can be in the form of dehydrated potato flakes, granules, or flanules. Any suitable method for obtaining a flour or starch from a tuber may be used (See, U.S. Pat. Nos. 7,060,318; 8,440,251; 6,287,622; and U.S. Pat. Pub. No. 2006/0286242).

In some embodiments, the dry mixture comprises about 10% to about 100%, about 20% to about 100%, about 30% to about 90%, or about 40% to about 80% of a dry flour component derived from cereal or tuber based materials. In some embodiments, the dry mixture may also comprise native starch in an amount of about 0% to about 40%, about 2% to about 30%, about 2% to about 20%, or about 4% to about 16%. As used herein, the term native starch refers to the inherent starch component found in cereal grains or tuber sources where the starch granule is intact and displays a birefringent property when exposed to polarized light microscopy. In a further embodiment, the dry mixture comprises a modified food starch to enhance the flavor or texture properties of the cooked food product. Modified starch materials can be sourced from, but are not limited to, corn, potato, wheat, rice, rye, barley, sorghum, sweet potato, cassava, and tapioca. In some embodiments, the modified starch is derived from corn, potato, wheat, or tapioca. In some embodiments, the dry mixture comprises modified starch in an amount of about 0% to about 30%, about 1% to about 25%, about 1% to about 15%, or about 2% to about 10%. Suitable process for preparing modified food starches include, but are not limited to, partial cooking, pre-gelatinization, acetylation, substitution, enzymatic, and acidification. Any suitable method for obtaining and/or processing native or modified starches may be used (See, ANDREA BERTOLINI, STARCHES: CHARACTERIZATION, PROPERTIES AND APPLICATION ($1^{st}$ Ed. 2009); and OTTO B. WURZBURG, MODIFIED STARCHES PROPERTIES AND USES, ($6^{th}$ Ed 1986)).

In some embodiments, the dry mixture may further include other ingredients such as fiber, lecithin, protein, sugars, maltodextrins, hydrocolloids, gums, flavors, salts, leavening agents, yeast, acids, and combinations thereof.

In another embodiment, a dough is prepared by combining the dry mixture and water. In some embodiments, the amount of water is about 2% to about 50%, about 5% to about 45%, about 10% to about 40%, or about 20% to about 40%.

In some embodiments, a processing aid is included in the dough to minimize adhesion to dough process equipment. In some embodiments, the processing aid is selected from the group comprising food fats and oils, emulsifiers, lecithin, or other phospholipids. In some embodiments, the dough may further comprise an emulsifier such as mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, phospholipids, lecithin, and lysolecithin. Any suitable method for using a processing aid to minimize adhesion of dough to process equipment may be used.

In some embodiments, the emulsifier comprises monoglyceride in an amount of about 50% to about 100%, about 65% to about 98%, or about 80 to about 98%. In some embodiments, the emulsifier comprises a mixture of monoglyceride and diglyceride, where the monoglyceride is included in an amount of about 20% to about 50%, about 20% to about 40%, or about 30% to about 40%. In some embodiments, an emulsifier can be mixed with the dough in an amount of about 0% to about 5%, about 0.5% to about 4%, or about 1% to about 4%. (See, U.S. Pat. No. 4,560,569 for a discussion of the use of lecithin to minimize dough adhesion). In some embodiments, the emulsifier includes lecithin in an amount of about 0% to about 2%, about 0.1% to about 1%, or about 0.2% to about 0.7%.

Cooked Food Products

According to a first aspect of the disclosure, there is provided a cooked food product having reduced acrylamide levels after cooking, baking, frying, heating, or combinations thereof. The cooked food product comprises a food product or food intermediate derived from cereal or vegetable-based components or combinations thereof and an amount of a bran composition ranging from about 0.10% to about 5% by weight of the food product or food intermediate. The bran composition has an average particle size and the bran composition comprises an arabinoxylan complex in an amount of about 10% to about 40% by weight of the bran composition.

In another aspect of the present disclosure, there is provided an acrylamide inhibitor composition for thermal processing of a food product or food intermediate comprising a bran composition comprising from about 10% to about 40% of an arabinoxylan complex.

In some embodiments, the bran composition comprises an arabinoxylan complex in an amount of about 10% to about 40% by weight of the bran composition. In other embodiments, the bran composition comprises an arabinoxylan complex in an amount of about 20% to about 40%, about 30% to about 40%, or about 20% to about 30% by weight of the bran composition.

In some embodiments, the acrylamide inhibition agent for thermal processing of a food product or food intermediate comprises an extracted arabinoxylan complex in an amount of about 0.01% to about 10.0% of the food composition. In some embodiments, the extracted arabinoxylan complex is present in an amount of about 5.0% to about 10.0%, about 0.01% to about 4.0%, about 0.01% to about 2.0%, about 0.01% to about 1.6%, about 0.01 to about 0.8%, or about 0.01% to about 0.4% by weight of the food product or food intermediate.

In some embodiments, the bran used as the acrylamide inhibitor can be wet or dry milled. Any suitable method for milling bran may be used. (See, ELIESER S. POSNER & ARTHUR N. HIBBS, WHEAT FLOUR MILLING ($2^{nd}$ Ed. 2005); and MARTIN WATTS, CORN MILLING ($1^{st}$ Ed. 2009). Suitable bran compositions include Miller's bran, heavy bran, light bran, shorts, Red Dog, regular bran, or washed bran. In some embodiments, the bran is regular bran or washed bran. In some embodiments, the bran is washed bran. Any suitable method for washing bran may be used. (See, U.S. Pat. Nos. 2,725, 300; and 3,879,373).

In some embodiments, the cooked food product, the food product, or the food intermediate is selected from the group consisting of baked goods, muffins, rolls, cakes, pies, crackers, toaster pastries, pastries, grain based bars, granola bars, health food bars, breads, cereals, fruit snacks, fruit bars, pizza rolls, soups, pastas, potato crisps, potato chips, French fries, corn chips, tortilla chips, extruded snacks, enrobed extruded snacks, pretzels, popcorn, rice cakes, corn cakes, and fried foods. In particular embodiments, the cooked food product, the thermally processed food, the food product, or the food product intermediate is selected from the group consisting of potato chips, corn chips, breakfast cereals, crackers, cookies, pretzels, and bread products. In some embodiments, the food product or food intermediate comprises cereal grain or tuber based flour.

In still other embodiments, the cooked food product, the food product, or the food intermediate may include crackers, breads (e.g., rye, wheat, oat, potato, white, whole grain products, mixed flours, loaves, twists, buns, rolls, pitas, matzos, focaccia, melba toast, zwieback, croutons, soft pretzels, soft and hard bread sticks, heat and serves), toaster pastries, cookies, Danish pastries, croissant, tarts, pie crusts, pastries, muffins, brownies, sheet cakes, donuts, snack foods (e.g., pretzels, tortilla chips, corn chips, potato chips, fabricated snacks, fabricated potato crisps, extruded snacks, extruded filled snacks, trail mix, granola, snack mixes, shoe-string potatoes), flours, corn meal, polenta, mixes (e.g., cake mixes, biscuit mixes, brownie mixes, bread mixes, pancake mixes, waffle mixes, crepe mixes, batter mixes, pizza dough), refrigerated doughs (e.g., biscuits, breads, bread sticks, croissants, dinner rolls, pizza dough, cookies, Danish pastries, brownies, pie crust), frozen foods (e.g., pie crusts, pies, tarts, turnovers, pizzas, food pockets, cakes, French fries, hash browns, breaded products such as chicken and fish, breaded vegetables), bagels, breakfast cereals, biscuits, French fries, vegetables (e.g., dried, grilled, roasted, broiled, fried, vacuum dried), taco shells, hash browns, mashed potatoes, toast, grilled sandwiches, flour and corn tortillas, crepes, pancakes, waffles, batters, pizza crust, rice, herbs, spices, nuts, nut-based foods (e.g., peanut butter, foods containing chopped nuts), fruit (e.g., dried, grilled, roasted, broiled, fried, vacuum dried, baked, jellies, pie fillings, flambés, raisins), hush puppies, alcoholic beverages (e.g., beers and ales), products comprising roasted cocoa beans (e.g., cocoa, chocolates, confectionary coatings, hot chocolate, hot chocolate mixes, candy bars), and animal foods (e.g., dog food, cat food, etc.).

In some embodiments, the cooked food product is crackers. In some embodiments, the crackers are made from whole grain flour. In some embodiments, the crackers are made from whole wheat flour. (See, U.S. Pat. Nos. 7,947,320; 8,133,527; 8,652,557). Any suitable method for preparing crackers may be used (See, DUNCAN MANLEY, MANLEY'S TECHNOLOGY OF BISCUITS, CRACKERS, AND COOKIES, (4$^{th}$ Ed. 2011); SAMUEL A. MATZ, COOKIES AND CRACKER TECHNOLOGY (3$^{rd}$ Ed. 2009); U.S. Pat. Nos. 2,920,964; 4,900,577; 5,066,499; and 8,926,308).

In some embodiments, the food products include those made by expansion of partially, pre-cooked intermediate food products such as collets, pellets or half products. Suitable methods for making these expanded food products comprises subjecting the intermediate food product to a high temperature and pressure, and then releasing the pressure to cause the intermediate food product to expand. In some embodiments, multiple pre-cooked pellets or collets are placed within a sealed chamber that is heated and held closed for about 5 to about 15 seconds. Without being bound to theory, the evaporation of water from the pellets creates a superheated steam, resulting in a significantly elevated temperature within the chamber that is above the boiling point of water. The combination of high temperature and pressure causes the pellets to fuse and combine into a single continuous mass with a lower density than the starting materials. These food product forms are often referred to as cracker chips or popped chips. However, the cooking conditions necessary to make these products may also lead to high levels of acrylamide formation.

In some embodiments, the pre-cooked half products, pellets, or collets used to make the puffed final products can be made from dried potatoes, dried potato flakes, granules, or flanules. In some embodiments, the final product includes a dried potato material in an amount of about 25% to about 100%, about 40% to about 90%, or about 60% to about 90%.

In some embodiments, the food product is prepared using a snack puffing method. In some embodiments, the food product is prepared from an expandable pellet. In some embodiments, the food product is prepared by impingement. In some embodiments, the food product is a rehydratable food that is prepared by impingement. Any suitable method of expansion, impingement, or puffing may be used. (See, U.S. Pat. Nos. 7,770,513; 8,161,871; 8,227,005; 9,089,155; 6,432,463; 8,703,226; and 6,468,573.

In some embodiments, the food product is made from a dough that is sheeted and cooked, for instance snack crisps. In some embodiments, the food product is a formulated snack product made from a sheetable dough followed by baking. Any suitable method of making sheeted food products may be used (See, U.S. Pat. Nos. 3,998,975; 6,235,333; 5,464,642; 6,703,065; 7,482,033; 6,572,910; 5,690,982; 5,104,673; 5,802,959; 8,017,166; and U.S. Pat. Pub. No. 2012/0088019). In some embodiments, the food product is made from a sheeted dough made with potato mash or raw potato stock (See, U.S. Pat. Nos. 6,703,065; 8,632,835; and 6,251,465).

In some embodiments, the food product is a bread or bread-like product, including but not be limited to loaves, rolls, flat breads, puffed shells, popovers, croissants, baguettes, and scones. In some embodiments, the bread or bread-like product comprises loaves or rolls. In some embodiments, the food product is a loaf of bread. In some embodiments, the food product is a sliced bread loaf. Bread or bread-like products also include but are not limited to partially cooked pre-made forms with limited shelf stability having a moisture content in an amount of about 30% to about 50%. In some embodiments, the partially cooked breads that are then further cooked to completion and have a moisture content in an amount of about 15% to about 30%. In some embodiments, the partially cooked breads are then toasted to completion and have a moisture content in an amount of about 1% to about 15%. In some embodiments, the food product is a cooked and toasted bread with a moisture content in an amount of about 1% to about 10%, about 2% to about 8%, or about 2% to about 4%. Any suitable method for preparing a bread product may be used (See, C. A. STEAR, HANDBOOK OF BREADMAKING TECHNOLOGY, (1$^{st}$ Ed. 1990); WILLIAM P. EDWARDS, THE SCIENCE OF BAKERY PRODUCTS, (2007); U.S. Pat. Nos. 4,604,289; 8,017,172; and Z. Czuchajowska, et al., *Water Activity and Moisture Content of Dough and Bread*, 66:2 CEREAL CHEM., 128-132 (1989)).

In certain embodiments, the food product or food intermediate derived from cereal grains further includes free asparagine in an amount of about 0.05 mg/g to about 5.0 mg/g, about 0.1 mg/g to about 2.0 mg/g, about 0.1 mg/g to about 1.0 mg/g, or about 0.12 mg/g to about 0.60 mg/g on a dry weight basis of the food product or food intermediate. In other embodiments, the food product or food intermediate derived from tubers includes free asparagine in an amount of about 0.5 mg/g to about 60.0 mg/g, about 5 mg/g to about 50 mg/g, about 10 mg/g to about 40 mg/g, or about 20 mg/g to about 40 mg/g of the dry weight basis of the food product or food intermediate.

In some embodiments, the food product or food intermediate further includes reducing sugar in an amount of about 0.5 mg/g to about 50.0 mg/g on a dry weight basis of the food product or food intermediate. In certain embodiments, the food product or food intermediate includes reducing sugar in an amount of about 0.5 mg/g to about 4.0 mg/g, about 0.5 mg/g to about 3.0 mg/g, about 0.5 mg/g to about 2.0 mg/g, or about 0.5 to about 1.0 mg/g on a dry weight basis of the food product or food intermediate.

In some embodiments, the food product or food intermediate has a moisture content in an amount of about 2 wt % to about 50 wt %, about 5 wt % to about 45 wt %, about 10 wt % to about 45 wt %, or about 20 wt % to about 40 wt % based on the weight of the food product or food intermediate.

In some embodiments, the bran composition is included in an amount of about 0.1% to about 5% by weight on a dry weight basis of the food product or food intermediate. In still other embodiments, the bran composition is included in an amount of about 0.5% to about 4%, about 0.5% to about 3.5%, about 0.5% to about 3%, about 0.5% to about 2.5%, about 0.5% to about 2%, about 0.5% to about 1.5%, about 0.5% to about 1%, or about 0.5% to about 0.75% by weight on a dry weight basis of the food product or food intermediate.

The particle size of bran can be expressed as a weighted average of the various fractions. In some embodiments, the average mean particle size of bran is about 30 microns to about 1000 microns, about 40 microns to about 500 microns, about 50 microns to about 375 microns, or about 50 microns to about 200 microns. Without being bound by theory, the presence of larger bran particles may have the counterproductive effect of increasing the rate of moisture loss during cooking, which in turn may increase the level of acrylamide formation. In some embodiments, the maximum particle size of the bran particles is less than about 2000 microns, less than about 1000 microns, less than about 500 microns, or less than about 200 microns. According to aspects of the present disclosure, the bran particle size can be reduced by methods including, but not be limited to, rotor, impact, or jet milling processes such as hammer milling, pin milling, stone milling, and comminutive milling.

In certain embodiments, the bran composition further includes thiamin in an amount of about 5 to about 10 µg/g. In certain embodiments, the bran composition further includes riboflavin in an amount of about 2 to about 10 µg/g. In certain embodiments, the bran composition further includes niacin in an amount of about 100 to about 300 µg/g. In certain embodiments, the bran composition further includes vitamin B₀ in an amount of about 5 to about 20 µg/g. In certain embodiments, the bran composition further includes pantothenic acid in an amount of about 15 to about 30 µg/g. In certain embodiments, the bran composition further includes biotin in an amount of about 0.1 to about 1.0 µg/g. In certain embodiments, the bran composition further includes folate in an amount of about 0.5 to about 5 µg/g.

In embodiments, the arabinoxylan complex further comprises an acid selected from the group consisting of cinnamic acid, ferulic acid, diferulic acid, dehydrodiferulic acid, p-coumaric acid, sinapic acid, caffeic acid, methoxyphenol, and mixtures thereof. In one embodiment, the acid is ferulic acid.

The moisture level of the cooked food product can correlate strongly to the acceptability of the final flavor and texture attributes of a cooked food product. In some embodiments, the cooked food product is a grilled food product and the moisture content is less than about 12 wt %, less than about 8 wt %, less than about 4 wt %, or less than about 3 wt % based on the weight of the cooked food product. In other embodiments, the cooked food product is a baked, fried, extruded, or puffed food product such as chips, crisps, crackers chips, rods, cooked extrudate, and the like, and the moisture content is less than about 6 wt %, less than about 4 wt %, or less than about 3 wt % based on the weight of the cooked food product. In some embodiments, such as baked, untoasted bread, the cooked food product has a moisture content of about 10 wt % to about 40 wt %, about 15 wt % to about 35 wt %, about 15 wt % to about 30 wt %, or about 18 wt % to about 25% based on the weight of the cooked food product. In other embodiments, the cooked food product is toasted bread and the moisture content of the cooked food product is about 1 wt % to about 10 wt %, about 2 wt % to about 8 wt %, or about 3 wt % to about 5 wt % base on the weight of the cooked food product.

In some embodiments, the cooked food product has an acrylamide content in an amount of less than about 1500 ppb. In some embodiments, the cooked food product has an acrylamide content in an amount of less than about 1000 ppb, less than about 1000 ppb, less than about 500 ppb, less than about 250 ppb, or less than 100 ppb. The effectiveness of the acrylamide reduction effectuate by complexes of the present disclosure can be expressed as an acrylamide formation ratio (AFR) that is calculated as the acrylamide content of the final cooked food product expressed in ppb divided by the asparagine level of the starting food product or food product intermediate expressed as the mg/g content on dry weight basis of the food product or food product intermediate. In certain embodiments, the cooked food product has an AFR of less than about 30,000, less than about 10,000, less than about 3000, less than about 500, less than about 200, or less than about 100.

The color of the cooked food product is representative of the visual product appeal and positive taste attributes that are derived from Maillard browning reactions. It is desirable to have acrylamide reduction decoupled from the Maillard browning reactions that occur so that positive visual and taste attributes can be delivered with correspondingly low acrylamide content in the cooked food product. In some embodiments, the cooked food product has an L-color of about 50 to about 70 and an A-color of about 0 to about 6, an L-color of about 53 to about 65 and an A-color of about 0.5 to about 5.0, an L-color of about 56 to about 63 and an A-color of about 1.0 to about 4.5, or an A-color of about 1.3 to about 3.0 as measured using a Hunter Color Meter. The Hunter Color Meter is an accepted industry standard for determining the color of food products using an L-a-b color scale.

In some embodiments, the cooked food product has a ratio of A-color to level of acrylamide formed that is about 4 to about 30, about 2 to about 16, or about 1 to about 8, where the ratio is expressed in units of A-color as measured by a Hunter Color Meter divided by the level of acrylamide expressed in parts per million. The effectiveness of the acrylamide reduction derived from the presently disclosed disclosure may enable a higher level of color to be delivered per unit of acrylamide present in the final food product. In some embodiments, the cooked food product has an A-color that is about 120% to about 600% greater than the A-color of a corresponding cooked food product prepared without the bran composition, an A-color that is about 120% to about 300% greater than the A-color of a corresponding cooked food product prepared without the bran composition, an A-color that is about 120% to about 200% greater than the A-color of a corresponding cooked food product prepared without the bran composition, or an A-color that is about 150% to about 200% greater than the A-color of a corresponding cooked food product prepared without the bran composition.

Method of Reducing Acrylamide Formation

In one aspect, the present disclosure provides a method for the reduction of acrylamide in cooked food products. In one embodiment, the method comprises combining a food product or food intermediate with a bran composition before thermal processing (e.g., cooking).

The methods herein can be applied to the production of any cooked food product, including but not limited to carbohydrate-containing foods, especially low-moisture foods (e.g., less than about 10%), that are heated during preparation. For instance, the methods can be used to reduce the level of acrylamide found in mashed potatoes, potato chips, fabricated snack foods, French fries, breakfast cereals, breads, cookies, crackers, toaster pastries, pizza crust, pretzels, hash browns, tater tots, corn tortillas, taco shells, and the like.

Although the methods herein will generally be described in terms of particular cooked food products, it should be understood by one skilled in the art that the method herein can be applied to any cooked food product. Non-limiting examples include crackers, breads (e.g., rye, wheat, oat, potato, white, whole grain products, mixed flours, loaves, twists, buns, rolls, pitas, matzos, focaccia, melba toast, zwieback, croutons, soft pretzels, soft and hard bread sticks, heat and serves), toaster pastries, cookies, Danish pastries, croissant, tarts, pie crusts, pastries, muffins, brownies, sheet cakes, donuts, snack foods (e.g., pretzels, tortilla chips, corn chips, potato chips, fabricated snacks, fabricated potato crisps, extruded snacks, extruded filled snacks, trail mix, granola, snack mixes, shoe-string potatoes), flours, corn meal, polenta, mixes (e.g., cake mixes, biscuit mixes, brownie mixes, bread mixes, pancake mixes, crepe mixes, batter mixes, pizza dough), refrigerated doughs (e.g., biscuits, breads, bread sticks, croissants, dinner rolls, pizza dough, cookies, Danish pastries, brownies, pie crust), frozen foods (e.g., pie crusts, pies, tarts, turnovers, pizzas, food pockets, cakes, French fries, hash browns, breaded products such as chicken and fish, breaded vegetables), bagels, breakfast cereals, biscuits, French fries, vegetables (e.g., dried, grilled, roasted, broiled, fried, vacuum dried), taco shells, hash browns, mashed potatoes, toast, grilled sandwiches, flour and corn tortillas, crepes, pancakes, waffles, batters, pizza crust, rice, herbs, spices, nuts, nut-based foods (e.g., peanut butter, foods containing chopped nuts), fruit (e.g., dried, grilled, roasted, broiled, fried, vacuum dried, baked, jellies, pie fillings, flambés, raisins), hush puppies, alcoholic beverages (e.g., beers and ales), products comprising roasted cocoa beans (e.g., cocoa, chocolates, confectionary coatings, hot chocolate, hot chocolate mixes, candy bars), and animal foods (e.g., dog food, cat food, etc.).

In some embodiments, the food product or food intermediate has a moisture content of about 50 wt %, 40 wt %, 30 wt %, 20 wt %, 10 wt %, 5 wt %, 2.5 wt %, 1 wt %, or 0.5 wt % based on the weight of the food product or food intermediate. In other embodiments, the food product or food product intermediate has a moisture content of about 40 wt % to about 60 wt %, about 40 wt % to about 50 wt %, about 30 wt % to about 40 wt %, about 20 wt % to about 30 wt %, about 10 wt % to about 20 wt %, about 0.5 wt % to about 10 wt %, about 0.5 wt % to about 5 wt %, about 0.5 wt % to about 2.5 wt %, or about 0.5 wt % to about 1 wt % based on the weight of the food product or food intermediate.

In some embodiments, the step of thermal processing reduces the moisture content of the food product or food intermediate by about 99%, about 95%, about 90%, about 80%, about 75%, about 70%, about 60%, about 50%, about 40%, about 30%, about 20%, or about 10%. In some embodiments, the step of thermal processing reduces the moisture content of the food product or food intermediate by about 10% to about 99%, about 10% to about 95%, about 10% to about 90%, about 10% to about 80%, about 10% to about 70%, about 10% to about 60%, about 10% to about 50%, about 20% to about 80%, about 20% to about 60%, about 30% to about 60%, about 40% to about 50%, or about 50%.

In some embodiments, the bran composition is added, included, or mixed into the food product or food intermediate in an amount of about 0.1% to about 5% by weight of the food product or food intermediate. In still other embodiments, the bran composition is included in an amount of about 0.1% to about 4%, 0.1% to about 3%, 0.1% to about 2%, 0.1% to about 1%, 0.1% to about 0.5%, 0.5% to about 4%, about 0.5% to about 3.5%, about 0.5% to about 3%, about 0.5% to about 2.5%, about 0.5% to about 2%, about 0.5% to about 1.5%, about 0.5% to about 1%, or about 0.5% to about 0.75% by weight of the food product or food intermediate.

In some embodiments, the bran composition comprises an arabinoxylan complex in an amount of about 10% to about 40% by weight of the bran composition. In other embodiments, the bran composition comprises an arabinoxylan complex in an amount of about 20% to about 40%, about 30% to about 40%, or about 20% to about 30% by weight of the bran composition.

In some embodiments, the bran composition comprises an extracted arabinoxylan complex in an amount of about 5.0% to about 10.0%, about 0.01% to about 2.0%, about 0.01% to about 4.0%, about 0.01% to about 1.6%, about 0.01% to about 0.8%, or about 0.01% to about 0.4% by weight.

The particle size of bran can be expressed as a weighted average of the various fractions. In some embodiments, the average mean particle size of bran is about 30 microns to about 1000 microns, about 40 microns to about 500 microns, about 50 microns to about 375 microns, or about 50 microns to about 200 microns. Without being bound by theory, the presence of larger bran particles may have the counterproductive effect of increasing the rate of moisture loss during cooking, which in turn may increase the level of acrylamide formation. In some embodiments, the maximum particle size of the bran particles is less than about 2000 microns, less than about 1000 microns, less than about 500 microns, or less than about 200 microns. According to aspects of the present disclosure, the bran particle size can be reduced by methods including, but not be limited to, rotor, impact, or jet milling processes such as hammer milling, pin milling, stone milling, and communitive milling.

In another aspect of the present disclosure, there is provided a method of reducing the amount of acrylamide produced by thermal processing of a food product or food intermediate comprising free asparagine and a reducing sugar. The method comprises adding a bran composition to the food product or food intermediate and thermally processing the food product or food intermediate to form a cooked food product. The amount of added bran composition is about 0.10% to about 5% by weight of the food product or food intermediate. The bran composition comprises an arabinoxylan complex in an amount of about 10% to about 40% by weight of the bran composition.

In still another aspect, the disclosure provides a method of reduction of formation of acrylamide in a heat-treated food product. The method comprises providing a food product or food intermediate in need of reduction of formation of acrylamide during heating and applying a bran composition to the food product or food intermediate in an amount effective to reduce formation of acrylamide during heating to a level that is lower than if the bran composition had not been applied. The food product or food intermediate is subjected to thermal processing of at least about 120° F. The bran composition comprises an arabinoxylan complex in an amount of about 10% to about 40% by weight of the bran composition.

In some embodiments, the food product or food intermediate is subjected to thermal processing of at least about 120° F. In other embodiments, the food product or food intermediate is subject to thermal processing of at least about 130° F., 140° F., 150° F., 160° F., 170° F., 180° F., 190° F., or 200° F. In some embodiments, after the food product or food intermediate is subjected to thermal processing of at least about 120° F., the food product or food intermediate is provided in a refrigerated state. In some embodiments, after the food product or food intermediate is subjected to thermal processing of at least about 120° F., the food product or food intermediate is provided in a frozen state.

In yet another aspect, the disclosure provides a method for reducing an amount of acrylamide formation in a foodstuff containing an amino acid and a reducing sugar. The method comprises contacting the foodstuff with a bran composition prior to heating. The reducing is in comparison with a foodstuff that has not been contacted with the bran composition. The composition comprises an arabinoxylan complex in an amount of about 10% to about 40% by weight of the bran composition.

In some embodiments, the method includes a step of mixing the bran composition and the food product or food intermediate before the thermally processing step. In certain embodiments, the bran composition is mixed with other ingredients to form a dough.

The bran compositions can be added to the food product or food intermediate before cooking via a number of mixing processes. Ideally well dispersed, homogenous mixing occurs. In some embodiments, the step of applying the composition is accomplished using a mixing process. In certain embodiments, the mixing process is selected from the group consisting of paddle mixing, ribbon blending, horizontal shaft mixing, extruding, V-blending, turbolizing, and fluidized bed mixing.

In particular embodiments, the method includes a step of washing the bran prior to the applying step. Washing the bran to reduce or remove the presence of free asparagine that may have been inherent with the starting bran composition was also found to enable the acrylamide reduction capability in the final food application.

In embodiments, the step of washing bran reduces the amount of free asparagine by about 90%, 80%, 70%, 60%, 50%, 40%, 30%, 20%, or 10%. In some embodiments, the step of washing reduces the amount of free asparagine by about 0.1 mg/g to about 30 mg/g, about 5 mg/g to about 25 mg/g, about 10 mg/g to about 20 mg/g, or about 15 mg/g.

In certain embodiments, the adding step of the method adds an amount of the bran composition that is sufficient to produce a final level of acrylamide in the cooked food product that is at least about 40% lower than a final level of acrylamide in a same cooked food product made without addition of the bran composition. In some embodiments, the adding step of the method adds an amount of the bran composition that is sufficient to produce a final level of acrylamide in the cooked food product that is at least about 35%, about 30%, about 25%, about 20%, about 15%, about 10%, or about 5% lower than a final level of acrylamide in a same cooked food product made without the addition of the bran composition.

In some embodiments, the adding step of the method adds an amount of the bran composition that is sufficient to produce a final level of acrylamide in the cooked food product that is in the range of about 10% to about 60% lower than a final level of acrylamide in a same cooked food product made without addition of the bran composition. In other embodiments, the adding step of the method adds an amount of the bran composition that is sufficient to produce a final level of acrylamide in the cooked food product that is about 10% to about 50%, about 10% to about 40%, about 10% to about 30%, about 10% to about 20%, about 20% to about 50%, about 30% to about 40%, or about 40% lower than a final level of acrylamide in a same cooked food product made without addition of the bran composition.

In some embodiments, the method also includes the step of partially baking the food product or food intermediate prior to the step of subjecting the food product or food intermediate to thermal processing of at least about 120° F. In some embodiments, the thermal processing temperature is at least about 130° F., 140° F., 150° F., 160° F., 170° F., 180° F., 190° F., or 200° F.

In some embodiments, after the food product or food intermediate is subjected to thermal processing of at least about 120° F., the food product or food intermediate is provided in a fresh, unrefrigerated state. In some embodiments, after the food product or food intermediate is subjected to thermal processing of at least about 120° F., the food product or food intermediate is provided in a refrigerated state. In some embodiments, after the food product or food intermediate is subjected to thermal processing of at least about 120° F., the food product or food intermediate is provided in a frozen state.

In particular embodiments, the step of thermally processing comprises baking, toasting, frying, grilling, microwave heating, convective heating, induction heating, extrusion, infrared heating, puffing, or combinations thereof. In an embodiment, the thermally processing step comprises frying the food product or food intermediate. In another embodiment, the thermally processing step comprises baking the food product or food intermediate.

In certain embodiments, the step of thermally processing uses a temperature of about 120° F. to about 600° F. for a time of about 0.5 to about 30 minutes. In other embodiments, the step of thermally processing uses a temperature of about 200° F. to about 500° F., about 150° F. to about 450° F., about 275° F. to about 450° F., about 200° F. to about 400° F., about 280° F. to about 400° F., or about 340° F. to about 400° F. In certain embodiments, the step of thermally processing is for a time of about 1 to about 10 minutes, about 3 to about 10 minutes, about 3 to about 360 seconds, about 4 to about 240 seconds, about 4 to about 180 seconds, about 4 to about 30 seconds, about 0.1 to about 10 seconds, or about 0.1 to about 5 seconds.

Cooked food products prepared according to the methods herein can have a reduction in the acrylamide level of at least about 10%, at least about 20%, at least about 30%, at least about 40%, at least about 50%, at least about 60%, at least about 70%, at least about 80%, or at least about 90%.

In some embodiments, the cooked food product has an acrylamide content in an amount of less than about 1500 ppb. In some embodiments, the cooked food product has an acrylamide content in an amount of less than about 1000 ppb, less than about 1000 ppb, less than about 500 ppb, less than about 250 ppb, or less than 100 ppb. The effectiveness of the acrylamide reduction effectuate by complexes of the present disclosure can be expressed as an acrylamide formation ratio (AFR), as described hereinabove. In certain embodiments, the cooked food product has an AFR of less than about 30,000, less than about 10,000, less than about 3000, less than about 500, less than about 200, or less than about 100.

The moisture level of the cooked food product can correlate strongly to the acceptability of the final flavor and texture attributes of a cooked food product. In some embodiments, the cooked food product is grilled and the moisture content is less than about 12 wt %, less than about 8 wt %, less than about 4 wt %, or less than about 3 wt % based on the weight of the cooked food product. In other embodiments, the cooked food product is baked, fried, extruded, or puffed, and the moisture content is less than about 6 wt %, less than about 4 wt %, or less than about 3 wt % based on the weight of the cooked food product. In some embodiments, the food product is baked or untoasted bread, and the cooked food product has a moisture content of about 10 wt % to about 40 wt %, about 15 wt % to about 35 wt %, about 15 wt % to about 30 wt %, or about 18 wt % to about 25% based on the weight of the cooked food product. In other embodiments, the cooked food product is toasted bread and the moisture content of the cooked food product is about 1 wt % to about 10 wt %, about 2 wt % to about 8 wt %, or about 3 wt % to about 5 wt % base on the weight of the cooked food product.

The color of the cooked food product is representative of the visual product appeal and positive taste attributes that are derived from Maillard browning reactions. It is desirable to have acrylamide reduction decoupled from the Maillard browning reactions that occur so that positive visual and taste attributes can be delivered with correspondingly low acrylamide content in the cooked food product. In some embodiments, the cooked food product has an L-color of about 50 to about 70 and an A-color of about 0 to about 6, an L-color of about 53 to about 65 and an A-color of about 0.5 to about 5.0, an L-color of about 56 to about 63 and an A-color of about 1.0 to about 4.5, or an A-color of about 1.3 to about 3.0 as measured using a Hunter Color Meter. The Hunter Color Meter is an accepted industry standard for determining the color of food products using an L-a-b color scale.

In some embodiments, the cooked food product has a ratio of A-color to level of acrylamide formed that is about 4 to about 30, about 2 to about 16, or about 1 to about 8, where the ratio is expressed in units of A-color as measured by a Hunter Color Meter divided by the level of acrylamide expressed in parts per million. The effectiveness of the acrylamide reduction derived from the presently disclosed disclosure may enable a higher level of color to be delivered per unit of acrylamide present in the final food product. In some embodiments, the cooked food product has an A-color that is about 120% to about 600% greater than the A-color of a corresponding cooked food product prepared without the bran composition, an A-color that is about 120% to about 300% greater than the A-color of a corresponding cooked food product prepared without the bran composition, an A-color that is about 120% to about 200% greater than the A-color of a corresponding cooked food product prepared without the bran composition, or an A-color that is about 150% to about 200% greater than the A-color of a corresponding cooked food product prepared without the bran composition.

In some embodiments, a cooked food product having reduced acrylamide levels after cooking, baking, frying, heating, or combinations thereof is provided. The cooked food product comprises a food product or food intermediate derived from cereal or vegetable-based components or combinations thereof. The cooked food product further comprises a bran composition in an amount of about 0.1% to about 5% by weight of the food product or food intermediate, wherein the bran composition has an average particle size. The bran composition comprises an arabinoxylan complex in an amount of about 10% to about 40% by weight of the bran composition. In some embodiments, the bran composition comprises wheat, rye, barley, corn, flax, or combinations thereof.

In some embodiments, a cooked food product having reduced acrylamide levels after cooking, baking, frying, heating, or combinations thereof is provided. The cooked food product comprises a food product or food intermediate derived from cereal or vegetable-based components or combinations thereof. The cooked food product further comprises a bran composition in an amount of about 0.1% to about 5% by weight of the food product or food intermediate, wherein the bran composition has an average particle size. The bran composition comprises an arabinoxylan complex in an amount of about 10% to about 40% by weight of the bran composition. In some embodiments, the cooked food product comprises a moisture content of less than about 40% by weight of the cooked food product.

In some embodiments, a cooked food product having reduced acrylamide levels after cooking, baking, frying, heating, or combinations thereof is provided. The cooked food product comprises a food product or food intermediate derived from cereal or vegetable-based components or combinations thereof. The cooked food product further comprises a bran composition in an amount of about 0.1% to about 5% by weight of the food product or food intermediate, wherein the bran composition has an average particle size. The bran composition comprises an arabinoxylan complex in an amount of about 10% to about 40% by weight of the bran composition. In some embodiments, the cooked food product comprises a moisture content in an amount of about 10% to about 40% by weight of the cooked food product.

In some embodiments, a cooked food product having reduced acrylamide levels after cooking, baking, frying, heating, or combinations thereof is provided. The cooked food product comprises a food product or food intermediate derived from cereal or vegetable-based components or combinations thereof. The cooked food product further comprises a bran composition in an amount of about 0.1% to about 5% by weight of the food product or food intermediate, wherein the bran composition has an average particle size. The bran composition comprises an arabinoxylan complex in an amount of about 10% to about 40% by weight of the bran composition. In some embodiments, the cooked food product comprises an acrylamide content of less than about 1500 ppb.

In some embodiments, a cooked food product having reduced acrylamide levels after cooking, baking, frying, heating, or combinations thereof is provided. The cooked food product comprises a food product or food intermediate derived from cereal or vegetable-based components or combinations thereof. The cooked food product further comprises a bran composition in an amount of about 0.1% to about 5% by weight of the food product or food intermediate, wherein the bran composition has an average particle size. The bran composition comprises an arabinoxylan complex in an amount of about 10% to about 40% by weight of the bran composition. In some embodiments, the arabinoxylan complex further comprises an acid selected from the group consisting of cinnamic acid, ferulic acid, diferulic acid, and methoxyphenol.

In some embodiments, a cooked food product having reduced acrylamide levels after cooking, baking, frying, heating, or combinations thereof is provided. The cooked food product comprises a food product or food intermediate derived from cereal or vegetable-based components or combinations thereof. The cooked food product further comprises a bran composition in an amount of about 0.1% to about 5% by weight of the food product or food intermediate, wherein the bran composition has an average particle size. The bran composition comprises an arabinoxylan complex in an amount of about 10% to about 40% by weight of the bran composition. In some embodiments, the cooked food product comprises and L color of about 0 to about 6 and an A color of about 0.5 to about 5.

In some embodiments, a cooked food product having reduced acrylamide levels after cooking, baking, frying, heating, or combinations thereof is provided. The cooked food product comprises a food product or food intermediate derived from cereal or vegetable-based components or combinations thereof. The cooked food product further comprises a bran composition in an amount of about 0.1% to about 5% by weight of the food product or food intermediate, wherein the bran composition has an average particle size. The bran composition comprises an arabinoxylan complex in an amount of about 10% to about 40% by weight of the bran composition. In some embodiments, the average particle size of the bran composition is less than about 2000 microns.

In some embodiments, a cooked food product having reduced acrylamide levels after cooking, baking, frying, heating, or combinations thereof is provided. The cooked food product comprises a food product or food intermediate derived from cereal or vegetable-based components or combinations thereof. The cooked food product further comprises a bran composition in an amount of about 0.1% to about 5% by weight of the food product or food intermediate, wherein the bran composition has an average particle size. The bran composition comprises an arabinoxylan complex in an amount of about 10% to about 40% by weight of the bran composition. In some embodiments, the cooked food product comprises a moisture content of less than about 40% by weight of the cooked food product. In some embodiments, the cooked food product comprises an acrylamide content of less than about 1500 ppb. In some embodiments, the cooked food product comprises an L-color of about 0 to about 6 and an A-color of about 0.5 to about 5. In some embodiments, the average particle size of the bran composition is less than about 2000 microns.

In some embodiments, an acrylamide inhibitor composition for thermal processing of a food product or food intermediate is provided. In some embodiments, the composition comprises a bran composition comprising an arabinoxylan complex in an amount of about 10% to about 40% by weight of the bran composition. In some embodiments, the bran composition comprises wheat, rye, barley, corn, flax, or combinations thereof.

In some embodiments, an acrylamide inhibitor composition for thermal processing of a food product or food intermediate is provided. In some embodiments, the composition comprises a bran composition comprising an arabinoxylan complex in an amount of about 10% to about 40% by weight of the bran composition. In some embodiments, the arabinoxylan complex further comprises an acid selected from the group consisting of cinnamic acid, ferulic acid, diferulic acid, caffeic acid, methoxyphenol, and mixtures thereof.

In some embodiments, an acrylamide inhibitor composition for thermal processing of a food product or food intermediate is provided. In some embodiments, the composition comprises a bran composition comprising an arabinoxylan complex in an amount of about 10% to about 40% by weight of the bran composition. In some embodiments, the bran composition has an average particle size of less than about 2000 microns.

In some embodiments, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition. In some embodiments, the step of adding adds an amount of the bran composition that is sufficient to produce a final level of acrylamide in the cooked food product that is at least about 20% lower than a final level of acrylamide in a same cooked food product made without the bran composition.

In some embodiments, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition. In some embodiments, the step of adding adds an amount of the bran composition that is sufficient to produce a final level of acrylamide in the cooked food product that is in the range of about 10% to about 60% lower than a final level of acrylamide in a same cooked food product made without the bran composition.

In some embodiments, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition. In some embodiments, the step of thermally processing comprises baking, toasting, frying, grilling, microwave heating, convective heating, induction heating, extrusion, infrared heating, puffing, or combinations thereof.

In some embodiments, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition. In some embodiments, the step of thermally processing uses a temperature of about 120° F. to about 600° F. for a time of about 0.5 to about 30 minutes.

In some embodiments, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition. In some embodiments, the free asparagine is present in an amount of about 0.5 mg/g to about 60 mg/g of the food product or food intermediate.

In some embodiments, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition. In some embodiments, the reducing sugar is present in an amount of about 0.5 mg/g to about 50 mg/g of the food product or food intermediate. In some embodiments, the reducing sugar is selected from the group consisting of fructose, mannose, and dextrose.

In some embodiments, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition. In some embodiments, the cooked food product has a moisture content of less than about 40% by weight of the thermally processed food.

In some embodiments, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition. In some embodiments, the cooked food product has an L-color of about 0 to about 6 and an A-color of about 0.5 to about 5.

In some embodiments, a method of reducing the amount of acrylamide produced by thermal processing of a food product or food intermediate comprising free asparagine and a reducing sugar is provided. The method comprises adding a bran composition to the food product or food intermediate and thermally processing the food product or food intermediate to form a cooked food product. The bran composition comprises an arabinoxylan complex in an amount of about 10% to about 40% by weight of the bran composition. In some embodiments, the step of adding adds an amount of the bran composition that is sufficient to produce a final level of acrylamide in the cooked food product that is at least about 20% lower than a final level of acrylamide in a same cooked food product made without the bran composition. In some embodiments, the step of thermally processing uses a temperature of about 120° F. to about 600° F. for a time of about 0.5 to about 30 minutes. In some embodiments, the cooked food product has a moisture content of less than about 40% by weight of the thermally processed food.

In some embodiments, a method of reducing the formation of acrylamide in a heat-treated food product is provided. The method comprises providing a food product or food intermediate in need of reduction of formation of acrylamide during heating. A bran composition is applied to the food product or food product intermediate in an amount effective to reduce formation of acrylamide during heating to a level that is lower than if the bran composition had not been applied. The food product or food product intermediate is then subjected to thermal processing at a temperature of at least about 120° F. The bran composition comprises an arabinoxylan complex in an amount of about 10% to about 40% by weight of the bran composition. In some embodiments, the method further comprises the step of partially baking the food product or food intermediate prior to the step of subjecting the food product or food intermediate to thermal processing at a temperature of at least about 120° F.

In some embodiments, a method of reducing the formation of acrylamide in a heat-treated food product is provided. The method comprises providing a food product or food intermediate in need of reduction of formation of acrylamide during heating. A bran composition is applied to the food product or food product intermediate in an amount effective to reduce formation of acrylamide during heating to a level that is lower than if the bran composition had not been applied. The food product or food product intermediate is then subjected to thermal processing at a temperature of at least about 120° F. The bran composition comprises an arabinoxylan complex in an amount of about 10% to about 40% by weight of the bran composition. In some embodiments, after the step of subjecting the food product or food intermediate to thermal processing, the food product or food intermediate is provided in a fresh, unrefrigerated state.

In some embodiments, a method of reducing the formation of acrylamide in a heat-treated food product is provided. The method comprises providing a food product or food intermediate in need of reduction of formation of acrylamide during heating. A bran composition is applied to the food product or food product intermediate in an amount effective to reduce formation of acrylamide during heating to a level that is lower than if the bran composition had not been applied. The food product or food product intermediate is then subjected to thermal processing at a temperature of at least about 120° F. The bran composition comprises an arabinoxylan complex in an amount of about 10% to about 40% by weight of the bran composition. In some embodiments, after the step of subjecting the food product or food intermediate to thermal processing, the food product or food intermediate is provided in a refrigerated state.

In some embodiments, a method of reducing the formation of acrylamide in a heat-treated food product is provided. The method comprises providing a food product or food intermediate in need of reduction of formation of acrylamide during heating. A bran composition is applied to the food product or food product intermediate in an amount effective to reduce formation of acrylamide during heating to a level that is lower than if the bran composition had not been applied. The food product or food product intermediate is then subjected to thermal processing at a temperature of at least about 120° F. The bran composition comprises an arabinoxylan complex in an amount of about 10% to about 40% by weight of the bran composition. In some embodiments, after the step of subjecting the food product or food intermediate to thermal processing, the food product or food intermediate is provided in a frozen state.

In some embodiments, a process for reducing an amount of acrylamide formation in a cooked food product containing an amino acid and a reducing sugar is provided. The method includes contacting a food product or food intermediate with a bran composition prior to heating. The reducing is in comparison with a cooked food product that has not been contacted with the bran composition. The bran composition comprises an arabinoxylan complex in an amount of about 10% to about 40% by weight of the bran composition. In some embodiments, the amount of acrylamide formation in the cooked food product is reduced by about 10% to about 80%.

In some embodiments, a cooked food product having a reduced acrylamide level after cooking is provided. The cooked food product comprises a food product or food intermediate derived from cereal or vegetable-based components or combinations thereof and an extracted arabinoxylan complex in an amount of about 0.01% to about 2% by weight of the food product or food intermediate. In some embodiments, the cooked food product comprises a moisture content of less than about 40% by weight of the cooked food product.

In some embodiments, a cooked food product having a reduced acrylamide level after cooking is provided. The cooked food product comprises a food product or food intermediate derived from cereal or vegetable-based components or combinations thereof and an extracted arabinoxylan complex in an amount of about 0.01% to about 2% by weight of the food product or food intermediate. In some embodiments, the cooked food product further comprises acrylamide in an amount of less than about 1500 ppb.

In some embodiments, a cooked food product having a reduced acrylamide level after cooking is provided. The cooked food product comprises a food product or food intermediate derived from cereal or vegetable-based components or combinations thereof and an extracted arabinoxylan complex in an amount of about 0.01% to about 2% by weight of the food product or food intermediate. In some embodiments, the extracted arabinoxylan complex further comprises an acid selected from the group consisting of cinnamic acid, ferulic acid, diferulic acid, dehydroferulic acid, p-coumaric acid, sinapic acid, caffeic acid, methoxyphenol, and mixtures thereof.

In some embodiments, a cooked food product having a reduced acrylamide level after cooking is provided. The cooked food product comprises a food product or food intermediate derived from cereal or vegetable-based components or combinations thereof and an extracted arabinoxylan complex in an amount of about 0.01% to about 2% by weight of the food product or food intermediate. In some embodiments, the cooked food product comprises a moisture content of less than about 40% by weight of the cooked food product. In some embodiments, the cooked food product further comprises acrylamide in an amount of less than about 1500 ppb. In some embodiments, the extracted arabinoxylan complex further comprises an acid selected from the group consisting of cinnamic acid, ferulic acid, diferulic acid, dehydroferulic acid, p-coumaric acid, sinapic acid, caffeic acid, methoxyphenol, and mixtures thereof.

In some embodiments, a method of reducing the amount of acrylamide produced by thermal processing of a food product or food intermediate comprising free asparagine and a reducing sugar is provided. The method comprises adding an extracted arabinoxylan complex to the food product or food intermediate and thermally processing the food product or food intermediate to form a cooked food product. The food product or food intermediate comprises the extracted arabinoxylan complex in an amount of about 0.01% to about 2% by weight of the food product or food intermediate. In some embodiments, the extracted arabinoxylan complex further comprises an acid selected from the group consisting of cinnamic acid, ferulic acid, diferulic acid, dehydroferulic acid, p-coumaric acid, sinapic acid, caffeic acid, methoxyphenol; and mixtures thereof.

In some embodiments, a method of reducing the amount of acrylamide produced by thermal processing of a food product or food intermediate comprising free asparagine and a reducing sugar is provided. The method comprises adding an extracted arabinoxylan complex to the food product or food intermediate and thermally processing the food product or food intermediate to form a cooked food product. The food product or food intermediate comprises the extracted arabinoxylan complex in an amount of about 0.01% to about 2% by weight of the food product or food intermediate. In some embodiments, the step of thermally processing uses a temperature of about 120° F. to about 600° F. for a time of about 0.5 to about 30 minutes.

Analytical Methods

Parameters used to characterize elements of the present disclosure are quantified by particular analytical methods. These methods are described in detail as follows.

Method for Measuring Acrylamide (AA) in Food Products

Sample Preparation: Cooked food products were spiked with $^{13}C_3$-acrylamide ($^{13}C_3$-AA) and extracted with water. The aqueous supernatant was purified using two steps of solid phase extraction (SPE). The purified extract was analyzed by LC/MS with selected ion monitoring for specific detection of AA and $^{13}C_3$-AA. Standards were prepared prior to conducting experiments. Stock solutions with internal standards were prepared. Calibration standards were also prepared.

Data Collection: Samples were analyzed using an Agilent 1100 HPLC interfaced to a Waters ZQ2000 mass spectrometer using a pneumatically assisted electrospray ionization interface. Mobile phase: 100% $H_2O$, 10 mM $NH_4Ac$, adjusted to pH 4.6 with formic acid. Column: 2.0 mm×150 mm, YMC C18 AQ (available from Waters Corp.). Flow rate: 0.2 mL/min. Interface: direct (no split). Injection volume: 5 µL. MS ionization mode: Electrospray, positive ion mode. MS detection mode: Selected ion monitoring for m/z 72 (AA), m/z 75 ($^{13}C_3$-AA); selected-ion-monitoring dwell times: 0.5 s.

Data Analysis: Response ratios (area of AA peak/area of $^{13}C_3$-AA peak) were plotted against the corresponding concentration of AA for a series of five standards. All standards contained 4.5 µg/mL $^{13}C_3$-AA, and AA concentrations ranging from 0 to 5 µg/mL. Linear regression resulted in a calibration curve from which the concentration of AA in extracts were determined from their measured response ratios.

% Reduction of acrylamide=[(acrylamide level in control sample−acrylamide level in bran-treated sample)/acrylamide level in control sample]×100. The control sample was prepared and cooked in exactly the same manner as the bran-treated sample, with the exception that the bran was not added.

EXAMPLES

The following Examples are illustrative of the present disclosure but are not meant to be limiting thereof. As used herein, all percentages, parts, and ratios are by weight unless otherwise specified.

Example 1

A wheat bran material was obtained, which was capable of providing acrylamide reduction in heated foods where the wheat bran was sourced from milled soft white winter wheat. The arabinoxylan content ranged from 18-20%. The bran was then washed and then micro pulverized to further reduce the starch content and increase the aribinoxylan content.

Example 2

Formulated potato chips were prepared with the following dry flour composition of Table 1:

TABLE 1

| Material | % in Dry Flour |
| --- | --- |
| Potato Flakes | 60-78 |
| Pre-Gelatinized Corn Flour | 5-10 |
| Pre-Gelatinized Rice Flour | 5-10 |
| Wheat Starch | 10-16 |
| Wheat Bran from Example 1 | 2 |

The dry flour was blended and then mixed with 34% water and 1% of a monoglyceride emulsifier to form loose dough. The dough was further milled to form a sheet of about 0.020 inches (about 0.5 mm). The sheet was cut into oval pieces of about 80 mm length by 50 mm width. The pieces were then fried between a pair of constrained molds at a temperature of about 370° F. for about 7-9 seconds to create a final chip moisture of about 2.0%. The final acrylamide level was about 25% lower than the control product that did not contain the wheat bran material from Example 1.

Example 3

Cracker chips were prepared with the following dry blend composition of Table 2:

TABLE 2

| Material | % in Dry Flour |
| --- | --- |
| Potato Flakes | 60-70 |
| Potato Starch | 10-20 |
| Rice Flour | 5-10 |
| Wheat Bran from Example 1 | 3 |

The dry formula was blended with added water at about a 35% level in a cooking and forming extruder to create half product pellets with a final moisture content of about 12%. The pellets were then puffed between a pair of molds held at a temperature of about 300° C. The acrylamide level was reduced by about 60% compared to the control product that did not contain the wheat bran material from Example 1.

Example 4

Toasted bread was prepared with and without a bran composition as described herein. The amount of acrylamide reduction (%) based on the amount of bran composition added is shown in Table 3. Table 3 demonstrates the effectiveness of the bran composition in reducing acrylamide formation, and shows that washing the bran composition prior to cooking improved the efficacy of acrylamide reduction.

TABLE 3

| Bran composition | Amount of composition, wt % | Acrylamide reduction, % | Weight loss, % |
| --- | --- | --- | --- |
| GPC Stabilized white wheat bran | 1.3 | 32.54 | 33.8 |
|  | 6.4 | 43.89 | 35 |
| GPC Washed white wheat bran | 0.6 | 38.31 | 33.7 |
|  | 3.2 | 57.29 | 32.1 |

Example 5

A model system was prepared by mixing constant amounts of asparagine and glucose in aqueous solution, adding an optional mitigating agent, drying, then toasting to form a food product. Levels of asparagine (residual ASN) and acrylamide (AA) in the toasted food product were measured. Table 4 below shows that the addition of washed wheat bran results in more residual asparagine and less acrylamide. Glucose appears to be entirely used up.

TABLE 4

| Sample | Residual ASN (mg) | Stdev | 2 Stdev | % RSD | AA (ppm) | Stdev | 2 Stdev | % RSD |
| --- | --- | --- | --- | --- | --- | --- | --- | --- |
| Control for 1 and 5 mg (no bran) | 0.27 | 0.00 | 0.00 | 0.0 | 2.89 | 0.12 | 0.23 | 4.0 |
| 1 mg Washed Wheat Bran | 0.54 | 0.23 | 0.47 | 43.5 | 2.85 | 0.18 | 0.35 | 6.2 |
| 5 mg Washed Wheat Bran | 0.66 | 0.09 | 0.18 | 13.9 | 2.72 | 0.18 | 0.37 | 6.8 |
| Control for 10 and 20 mg (no bran) | 0.41 | 0.14 | 0.28 | 35.0 | 3.17 | 0.22 | 0.44 | 7.0 |
| 10 mg Washed Wheat Bran | 1.04 | 0.33 | 0.66 | 31.6 | 2.70 | 0.08 | 0.16 | 2.9 |
| 20 mg Washed Wheat Bran | 1.16 | 0.10 | 0.21 | 8.8 | 3.00 | 0.13 | 0.26 | 4.3 |

The data shows a so-called minimum effect, where the minimum in acrylamide formation (greatest % reduction from the control) is observed around 10 mg wheat-bran point (and in some cases, about 8 to about 15 mg of washed wheat bran and/or about 0.8 to about 1.1 mg of residual asparagine). Surprisingly, the amount of residual asparagine continues to climb as the level of washed wheat bran rises, despite the fact that acrylamide formation rises beyond the minimum. Table 5 shows % acrylamide reduction relative to the residual asparagine.

TABLE 5

| Sample | Residual ASN (mg) | AA Reduction (%) |
|---|---|---|
| Control for 1 and 5 mg (no bran) | 0.27 | — |
| 1 mg Washed Wheat Bran | 0.54 | 1.38 |
| 5 mg Washed Wheat Bran | 0.66 | 5.88 |
| Control for 10 and 20 mg (no bran) | 0.41 | — |
| 10 mg Washed Wheat Bran | 1.04 | 14.8 |
| 20 mg Washed Wheat Bran | 1.16 | 5.36 |

FIG. 1 is a plot of % acrylamide reduction vs. residual asparagine. Table 5 and FIG. 1 shows the maximum acrylamide mitigation effect. For instance, it is believed that increasing the washed wheat bran protects the asparagine or slows down the reaction of the asparagine.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method of reducing the amount of acrylamide in a cooked food product, the method comprising:
   providing a food product having free asparagine and a reducing sugar;
   washing a bran composition having an arabinoxylan complex in an amount of from about 10% to about 40% by weight of the bran composition;
   adding the bran composition to the food product; and
   thermally processing the food product to form the cooked food product comprising acrylamide, wherein the amount of acrylamide in the cooked food product is reduced by at least about 20% lower than an amount of acrylamide in a similar cooked food product made without the bran composition;
   wherein the step of adding, comprises adding from about 0.10 to 5 wt % of the bran composition to the food product, which is an amount that is sufficient to produce a final level of acrylamide in the cooked food product.

2. The method of claim 1, further comprising a step of mixing the bran composition and the food product before the thermally processing step.

3. The method of claim 1, wherein the bran composition comprises wheat, rye, barley, corn, flax, or combinations thereof.

4. The method of claim 1, wherein the arabinoxylan complex further comprises an acid selected from cinnamic acid, ferulic acid, diferulic acid, caffeic acid, methoxyphenol, and mixtures thereof.

5. The method of claim 1, wherein the step of thermally processing uses a temperature of about 120° F. to about 600° F. for a time of about 0.5 to about 30 minutes.

6. The method of claim 1, wherein the free asparagine is present in an amount of about 0.5 mg/g to about 60.0 mg/g of the food product.

7. The method of claim 1, wherein the reducing sugar is present in an amount of about 0.5 mg/g to about 50.0 mg/g of the food product on a dry weight basis.

8. The method of claim 1, wherein the cooked food product has a moisture content of less than about 40% by weight based on the weight of the cooked food product.

9. The method of claim 1, wherein the cooked food product is selected from the group consisting of crackers, breads, and chips, and wherein the cooked food product has an L-color from about 0 to about 6 and an A-color from about 0.5 to about 5, as determined using a Hunter Color Meter with an L-a-b color scale.

* * * * *